United States Patent [19]
Wilmarth

[11] 3,864,039
[45] Feb. 4, 1975

[54] RAIL GAGE APPARATUS

[75] Inventor: Robert W. Wilmarth, Wellesley, Mass.

[73] Assignee: The United States of America as represented by the Secretary of the Department of Transportation, Washington, D.C.

[22] Filed: July 12, 1973

[21] Appl. No.: 378,510

[52] U.S. Cl. .................... 356/172, 33/287, 356/167
[51] Int. Cl. ...................... E01b 35/10, G01b 11/14
[58] Field of Search ...... 33/287, 332; 356/156, 167, 356/172

[56] References Cited
UNITED STATES PATENTS

| | | | |
|---|---|---|---|
| 3,458,261 | 7/1969 | Bentley et al. | 356/211 |
| 3,562,419 | 2/1971 | Stewart et al. | 33/287 |
| 3,730,633 | 5/1973 | Kennedy | 356/167 |

Primary Examiner—Vincent P. McGraw
Assistant Examiner—Richard A. Rosenberger
Attorney, Agent, or Firm—Herbert E. Farmer; Harold P. Deeley, Jr.

[57] ABSTRACT

Apparatus which can be affixed to the underside of revenue producing trains which will produce an electrical signal which is a measure of the gage or distance between the rails such that the condition and maintenance requirements of the track can be determined without interfering with the revenue service of the train.

4 Claims, 3 Drawing Figures

PATENTED FEB 4 1975 3,864,039

RAIL GAGE APPARATUS

ORIGIN OF THE INVENTION

The invention described herein was made by an employee of the United States Government and may be manufactured and used by or for the Government for governmental purpose without the payment of any royalties thereon or therefor.

BACKGROUND OF THE INVENTION

This invention relates to apparatus for measuring the gage of any given track, and more particularly, to apparatus which can be affixed to revenue producing trains which pass over the tracks in question and provide electrical signals representative of the gage of the track while the train travels at high speeds.

The gage of a pair of rails is defined as the distance between the rails measured at a point ⅝ inch below the top surface of the rail heads. Standard gage is specified as 56 ½ inches. While there are some exceptions to this the great majority of rail systems use standard gage. Regardless of what gage system is in use, a major cause for concern is when the gage due to wear, faulty construction or any other reason becomes enlarged. With standard gage, no track should be permitted a gage enlarged more than one inch.

With the advent of high speed commuter traffic between the various communities some means must be provided to measure the gage of the rails forming the track on a regular basis. Such information would enable the appropriate parties to schedule maintenance of the rails because the gage is an important factor relating to condition of the rails. Apparatus which would permit this to be accomplished rapidly and on a continuous basis would avoid tragic derailments and other accidents associated with deteriorating foundations supporting the tracks in question.

Considerable numbers of invention and devices have been proposed which are electro-optical in nature for the alignment of rails in the placement of track or in the maintenance of track and their repair. However no such devices or apparatus have been proposed to measure gage of a railroad at high speeds and attached to a regular revenue producing train. Prior art has utilized proximity type of devices for the measurement of rails. However, such devices had to be moved away from their required close proximity to the rail in order to avoid their damage when they approach certain switch gear and other devices used in the laying of rails or track. Moreover the devices so proposed were easily damaged by flying ballast. The present invention being electro-optical can be held quite remote from the rails and in a plane a safe distance above any conventional switch gear and also in an area secure from damage due to flying ballast and the like.

The present apparatus can be utilized as a limit device, that is, if the rails exceed a certain gage in a maximum or minimum manner, the precise point on the track will be recorded and maintenance crews will be dispatched to the locus in order to correct the problem. Or the device may be utilized in such a manner that the exact gage can be recorded thus providing a signature of any given rail system which can be compared from time to time to evaluate any changes that may occur even though they do not exceed established limits.

SUMMARY OF THE INVENTION

This invention is characterized by light sources which are focused onto the rail from the underside of a revenue producing train. The rails reflect certain of the light back to sensors mounted again on the underside of the train such that a signal is produced indicating any shifts in movement of the rails. Both the sensors and the light sources are a safe distance above the rails. Moreover, the sensors and light sources are recessed within tubes preventing any flying ballast or other material from inflicting any damage on the apparatus. Such equipment is therefore relatively trouble free and free of elaborate calibration. Therefore, an object of the present invention is to provide apparatus for high speed measurement of the gage between rails of a given track.

Another object of the present invention is to provide inexpensive apparatus indicating the gage of rails.

Still another object of the present invention is to provide apparatus which will produce the entire signature of a section of track.

And still another object of the present invention is to provide an electro-optical system for determining by means of an electrical output the gage of a given set of rails.

DESCRIPTION OF THE DRAWINGS

These and other objects, features and advantages of the present invention will become more apparent upon an examination of the following description when taken in conjunction with the accompanying drawings wherein.

DESCRIPTION OF THE PREFERRED EMBODIMENTS

Figure 1:
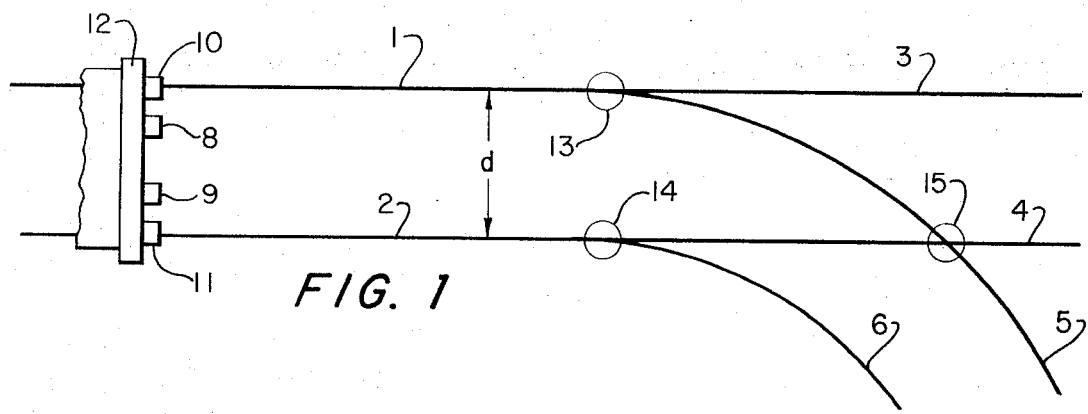
FIG. 1 illustrates the placement of the light sources and sensors with respect to a section of track.
Figure 2:
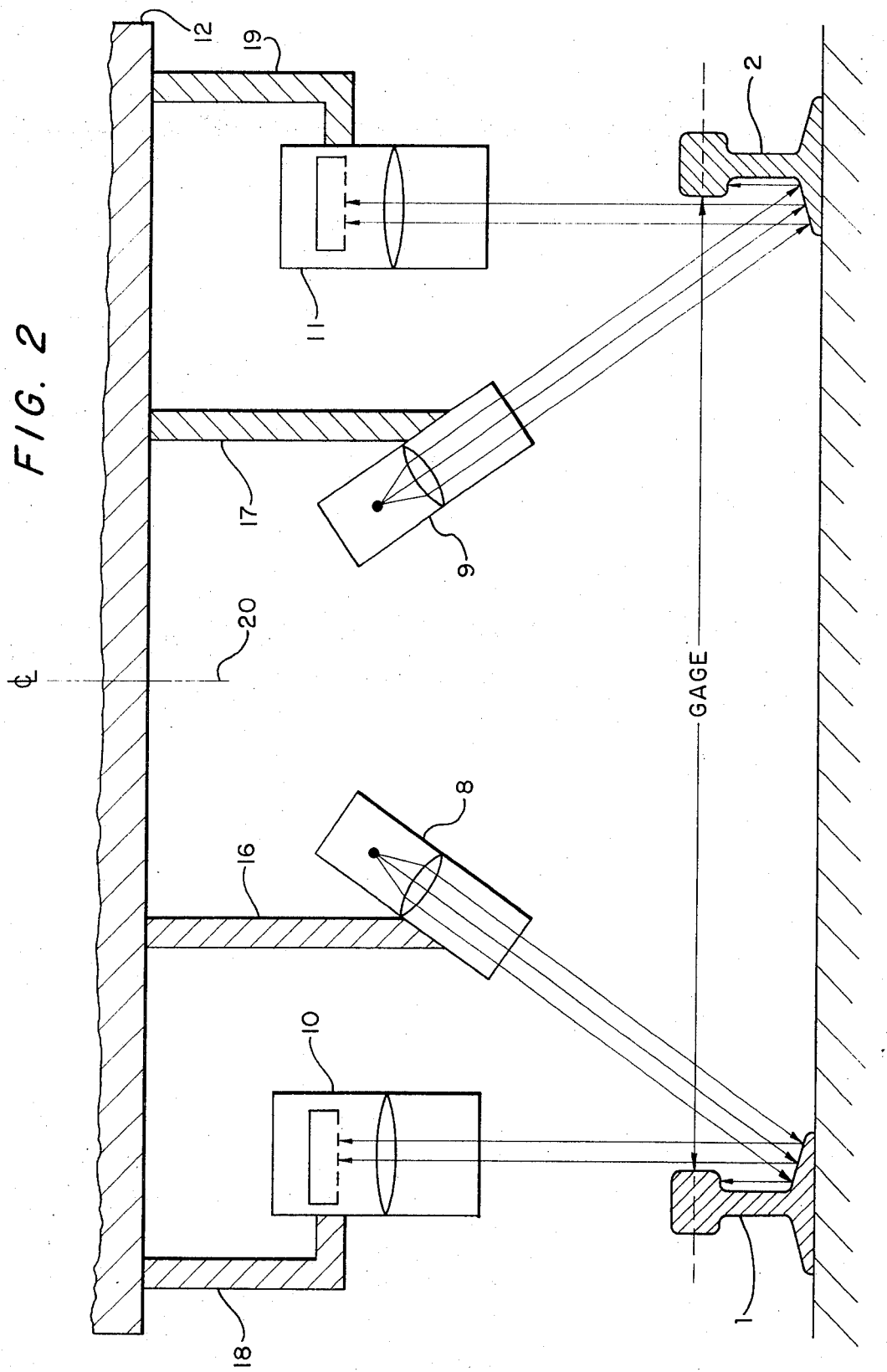
FIG. 2 is an embodiment of the present invention.

Referring now to FIG. 1, a pair of rails 1 and 2 make up a section of track. These rails separate into two tracks having rails 3, 4 and 5, 6, respectively. The rails 1 and 2; 3 and 4; 5 and 6 are separated by a known distance 'd' referred to as the gage and labeled 'd'. Two light source assemblies 8 and 9 and two sensor assemblies 10 and 11 are affixed to the train truck assembly either directly or to a rigid member 12 which in turn is affixed to the truck. The purpose of the direct or rigid mounting is to maintain a fixed spatial relationship between 8, 9, 10 and 11 so that the gage of the rails can be determined by summing the signals derived from the sensor assemblies 10 and 11. The rails 1 and 2 which make up the section of the track necessarily involve switch gear at points 13 and 14 and a cross over member 15 commonly referred to as a frog which would interfere with any apparatus which were required to be in close proximity to the rails. The present invention being positioned a considerable distance above the rails does not experience any difficulty nor is there any requirement to withdraw the apparatus when the train switches from one set of rails to another set of rails as in this case from rails 1 and 2 to 5 and 6. FIG. 2 illustrates the measuring system as it is located beneath a railroad car and in relation to the rails. Rigid member 12 can be either part of the rail car truck or a separate member affixed to the truck. The purpose of rigid member 12 is to maintain a fixed spatial relationship between light sources 8 and 9 and sensors 10 and 11 which are affixed to member 12 by brackets 16, 17, 18 and 19, respectively.

Figure 3:
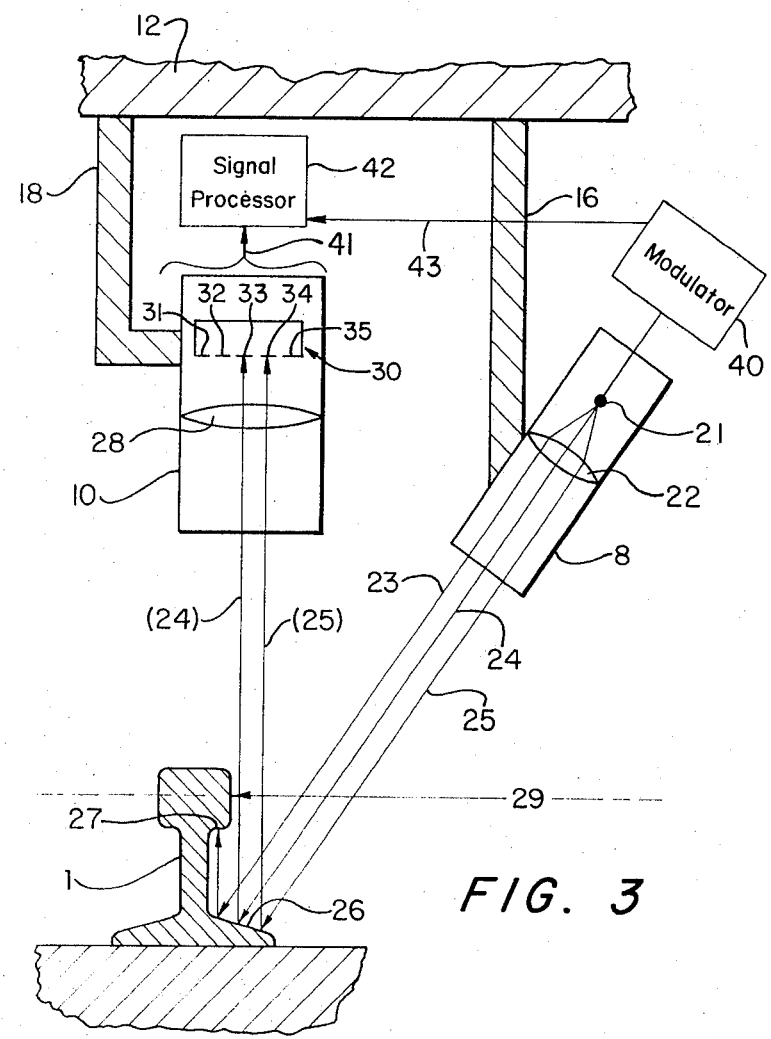
FIG. 3 illustrates the principle of operation of the invention.

It should be noted that the preferred mounting location of the measuring system is on a truck assembly rather than on the car frame proper since this will restrict lateral movement of the system with respect to the rails, especially when a car is negotiating a curve. Mounting on the frame is also undesirable due to movements associated with the suspension system. Refer to FIG. 3 for a more detailed discussion of the principle of operation. FIG. 3 depicts the arrangement shown on left side of FIG. 2. In FIG. 3 within the light source assembly 8 there is a source of illumination 21 and a collimating system 22. The light rays 23, 24 and 25 emerging from source assembly 8 are directed to a flange 26 of the rail 1. The rays are generally reflected upward such that some rays, as depicted by ray 23, will strike the base of the rail head 27 while other rays, depicted by rays 24 and 25, will pass to the side of the rail head into the sensor assembly 10. A focusing system 28 is used to project a sharp image of the side of the rail heat at the gage side 29 onto a photodetector 30 comprising, for example, an array of photo diodes 31, 32 33, 34 and 35. The electrical output of the photodetector 30 is fed to a signal processing unit 42. Since the rail is opaque the projected image is a shadow or silhouette. The focusing system 28 serves not only to reject non-vertically reflected rays but may if desired by used to enlarge or reduce the image projected on the photodetector. This feature permits the size of the photodetector to be either larger or smaller as the case may be than the lateral displacement of the system with respect to the rail. Rays 24 and 25 are shown encompassing array elements 33 through 35 while array elements 31 and 32 are in the shadow, hence relating the lateral location of the rail 1 with respect to the sensor assembly 10. By knowing the distance between the sensor assemblies 10 and 11 the gage of the rails 1 and 2 can be determined.

It of course follows that as the gage changes more or less of the photo diodes will be illuminated and since the signals from the two arrays are correlated electrically in signal processing unit 42 an analog electrical signal proportional to gage is realized. In constructing this system it is important that the sensor assemblies 10 and 11 have sufficient measurement range to account for all pssible relative lateral motions that might be set up. If it is assumed that the truck wheels to which the system is referenced are not worn, then lateral displacement can come about due to any of the following: the normal difference between wheel gage and rail gage; the effects of wheel hunting; open or wide gage; and motion of the measurement system with respect to the truck assembly.

With perfect wheels on standard gage rail there will be a difference of 13/16 inches between the rail gage and wheel gage. In other words the wheels can move sideways by this amount within the confines of contact between the wheel flanges and the side of the rail heads. As a train traverses a section of track there is indeed this type of motion due to the well-known effect of wheel hunting. If now the trains enters a section of track in which the gage is open then the amount by which it is open must be added to the value of 13/16 inches. If, for example, this value is arbirarily set at 1 ½ inches then the range of a sensor is the sum of these figures or 2 5/16 inches. If now there is any relative motion of the sensor system due to its mounting on the truck assembly then the amount of this motion must be added to the value of 2 5/16 inches. While hard mounting is certainly possible, consider a shock type of mounting with a lateral range of ± ¼ inches. In this case the sensor range is the sum of 2 5/16 and ½ inches or 2 13/16 inches.

In setting up such a system on a car, each sensor head is positioned for the full shadow to exist for the case of wheel flange to rail head contact along with the ¼ inch of excursion due to the mounting support. The actual gage now realtes to the sum of the electrical signals from each sensor head. The relationship between this signal and gage is set up for any desired signal level. In practice, however, this is adjusted to match the input requirements of the particular display or data recording equipment being used. By recording this signal along with travel distance information a gage map or record of a length of track is obtained.

Data has been obtained with an array of silicon pin diodes. However, numerous other arrangements can be made such as with broad area cadmium sulfide which produces an analog signal proportional to the amount of area that is illuminated. Many other obvious alterations and substitutions can be utilized to produce an electronic signal representative of that portion of the focal plane which is illuminated as a result of the reflected light which is able to pass by the rail head 29. The focusing of the light and the focusing of the reflection therefrom obviate light from other sources from defeating or reducing the sharp signal which the present invention produces representative of the gage of the given rails.

It is also to be understood that a number of light sources may be utilized with this system such as high intensity iodine lamps, and arc lamp, a laser source or a pulsed gas lamp. In FIG. 3 a modulator 40 is used to control the characteristics of the light output. The plused source embodiment is attractive in that it is inexpensive and it is readily possible to obtain light intensities many times in excess of normal ambient light thus minimizing or eliminating the effects of ambient light. Furthermore the effects of ambient light may be further suppressed by the judicious use of light filters. In the pulsed light system well-known synchronous detection techniques may be used wherein the detector signal is only sampled in a short time interval when a flash is present. In this case the processor 42 utilizes a synchronizing signal from the modulator 40 via an interconnecting line 43. By using a simple electronic high pass filter in the signal processor 42 to pass the repetition frequency of the pulsed source 21, it is also possible to discriminate against ambient light which contributes a steady state or DC component. Using this scheme it was possible to obtain the desired operation even when superimposing light from a high intensity quartz iodine lamp. The resolution of the system will depend upon the characteristics of the photo sensor.

With reference to FIGS. 2 and 3 the focusing 28 and collimating 22 systems are recessed within their respective assemblies 10 and 8 thus reducing the possibility of damage due to flying hazards such as ballast, etc., that may be generated beneath a train.

While I have described my invention with reference to specific apparatus I do not wish to be limited thereby for those skilled in the art may make many substitutions and variations without departing from the invention's true scope and spirit and I therefore do not wish to be limited only by the appended claims.

I claim:

1. Rail gage apparatus comprising in combination with a wheeled vehicle for traveling along two rails having opaque rail heads:

light projection means mounted on said vehicle illuminating the base of both of the rails;

light receiver means positioned above said opaque rail heads but not in physical contact therewith such that the amount of reflected light received is dependent upon the shadows cast by the positions of the gage side of said opaque rail heads; and means for converting said received light into continuous positional data signals representing the gage between rails.

2. Rail gage apparatus according to claim 1 which further includes means for modulating the light projection means and signal processing means connected to the output of the light receiver means for processing the detected signals to discriminate against unwanted light signals.

3. Rail gage apparatus according to claim 2 wherein said means for processing the detected signal comprises synchronous gating means.

4. Rail gage apparatus according to claim 2 wherein said means for processing the detected signal comprises filtering means at the modulation frequency.

* * * * *